United States Patent
Fujiwara

(10) Patent No.: US 9,545,893 B2
(45) Date of Patent: Jan. 17, 2017

(54) FAR SIDE AIRBAG DEVICE FOR VEHICLE

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/940,971

(22) Filed: Nov. 13, 2015

(65) Prior Publication Data

US 2016/0144821 A1 May 26, 2016

(30) Foreign Application Priority Data

Nov. 25, 2014 (JP) ................. 2014-238226

(51) Int. Cl.
*B60R 21/207* (2006.01)
*B60R 21/231* (2011.01)
*B60R 21/262* (2011.01)

(52) U.S. Cl.
CPC ....... *B60R 21/23138* (2013.01); *B60R 21/207* (2013.01); *B60R 21/262* (2013.01); *B60R 2021/23146* (2013.01); *B60R 2021/23161* (2013.01)

(58) Field of Classification Search
CPC .... B60R 21/207; B60R 21/215; B60R 21/217; B60R 21/2171; B60R 21/23138; B60R 2021/23146; B60R 21/26
USPC ...................................... 280/730.2
See application file for complete search history.

(56) References Cited

U.S. PATENT DOCUMENTS

| | | | | |
|---|---|---|---|---|
| 7,357,411 | B2* | 4/2008 | Kurimoto | B60R 21/23138 280/729 |
| 7,819,424 | B2* | 10/2010 | Toda | B60R 21/207 280/730.2 |
| 2005/0236819 | A1 | 10/2005 | Riedel et al. | |
| 2011/0049852 | A1 | 3/2011 | Kibat et al. | |
| 2011/0316264 | A1* | 12/2011 | Maruyama | B60R 21/2171 280/730.2 |
| 2012/0043741 | A1* | 2/2012 | Yamamoto | B60R 21/23138 280/730.2 |
| 2012/0049498 | A1 | 3/2012 | Wiik et al. | |
| 2012/0091697 | A1 | 4/2012 | Wiik et al. | |
| 2012/0200072 | A1* | 8/2012 | Fukawatase | B60R 21/23138 280/741 |

(Continued)

FOREIGN PATENT DOCUMENTS

JP 2005-306377 A 11/2005
JP 2011-057208 A 3/2011
(Continued)

*Primary Examiner* — Faye M Fleming
(74) *Attorney, Agent, or Firm* — Oliff PLC

(57) ABSTRACT

A far side airbag device for a vehicle has: an inflator that is provided at a central-side side portion of a seat back along a height direction of the seat back, and that jets gas out from a jetting portion; a side airbag that receives a supply of gas from the inflator and is thereby inflated and expanded; a diffuser that is housed at the interior of the side airbag, that receives a supply of gas from the inflator and is thereby inflated and expanded in a shape of a tube that surrounds the inflator; and a protecting patch that covers the gas supplying end portion in a state in which the side airbag and the diffuser are inflated and expanded.

11 Claims, 12 Drawing Sheets

(56) References Cited

U.S. PATENT DOCUMENTS

| | | | | |
|---|---|---|---|---|
| 2012/0248747 A1* | 10/2012 | Sugimoto | ............. | B60R 21/207 |
| | | | | 280/729 |
| 2015/0166003 A1* | 6/2015 | Fujiwara | ............... | B60R 21/207 |
| | | | | 280/730.2 |
| 2015/0246656 A1* | 9/2015 | Fujiwara | ............. | B60R 21/2346 |
| | | | | 280/730.2 |
| 2015/0367806 A1* | 12/2015 | Fujiwara | ............... | B60R 21/233 |
| | | | | 280/729 |

FOREIGN PATENT DOCUMENTS

| | | |
|---|---|---|
| JP | 2012-051557 A | 3/2012 |
| JP | 2012-081958 A | 4/2012 |

\* cited by examiner

FAR SIDE AIRBAG DEVICE FOR VEHICLE

CROSS-REFERENCE TO RELATED APPLICATION

This application is based on and claims priority under 35 USC 119 from Japanese Patent Application No. 2014-238226 filed on Nov. 25, 2014, the disclosure of which is incorporated by reference herein.

BACKGROUND

Technical Field

The present invention relates to a far side airbag device for a vehicle.

Related Art

There are far side airbag devices for a vehicle that are equipped with an inflator that is provided at the vehicle transverse direction central-side side portion of a seat back, and a side airbag that is provided in the side portion of the seat back and receives a supply of gas from the inflator and inflates and expands (see, for example, Japanese Patent Application Laid-Open (JP-A) No. 2012-051557, JP-A No. 2012-081958, JP-A No. 2005-306377, and JP-A No. 2011-057208).

By the way, in order to improve the inflation and expansion performance of a head portion protecting area that has a large volume at a side airbag, it has been thought to provide a jetting portion, that jets-out gas, at the upper end portion of the inflator. However, in this case, the following points are of concern. Namely, because the gas supplying end portion has a small diameter as compared with the inflator main body portion, if (the head portion of) a vehicle occupant of that seat or of another seat is pushed-against the side airbag that has inflated and expanded accompanying a vehicle collision, that vehicle occupant interferes, via the side airbag, with the upper end portion (the gas supplying end portion) of the inflator, and there is the possibility that the side airbag will be damaged.

SUMMARY

In view of the above-described circumstances, an object of the present invention is to provide a far side airbag device for a vehicle that can mitigate damage to a side airbag by a gas supplying end portion at the upper end side of an inflator.

A far side airbag device for a vehicle relating to a first aspect of the present invention has: an inflator that is provided at a vehicle transverse direction central-side side portion of a seat back along a height direction of the seat back, and that jets gas out from a jetting portion that is provided at a gas supplying end portion at an upper end side of the inflator; a side airbag that is provided at the vehicle transverse direction central-side side portion, has an interior that houses the inflator, receives a supply of gas from the inflator and is thereby inflated and expanded, and covers, from a vehicle transverse direction central side, at least a region from a chest portion to a head portion of a vehicle occupant; a diffuser that is housed at the interior of the side airbag, and that receives a supply of gas from the inflator and is thereby inflated and expanded in a shape of a tube that surrounds the inflator; and a protecting portion that covers the gas supplying end portion in a state in which the side airbag and the diffuser are inflated and expanded.

In accordance with the far side airbag device for a vehicle relating to the first aspect, the inflator is provided along the height direction of the seat back at the vehicle transverse direction central-side side portion of the seat back. The jetting portion is provided at the gas supplying end portion at the upper end side of the inflator. When gas is jetted-out from this jetting portion, the side airbag is inflated and expanded.

Further, the diffuser is housed at the interior of the side airbag. The diffuser receives a supply of gas from the inflator, and is inflated and expanded in the shape of a tube that surrounds the inflator. Due to the gas, that is jetted-out from the jetting portion of the inflator, being directed to flow upward and downward by the diffuser, the side airbag is inflated and expanded stably into a predetermined shape.

Moreover, as described above, the jetting portion is provided at the gas supplying end portion at the upper end side of the inflator. Due thereto, as compared with a case in which the jetting portion is provided at the lower end portion of the inflator, the side airbag can be inflated and expanded at an early stage at the vehicle transverse direction central side with respect to the head portion of the vehicle occupant. Accordingly, at the time of a side collision, the head portion of the vehicle occupant can be restrained more reliably by the side airbag.

Here, the gas supplying end portion of the inflator is covered by the protecting portion in the state in which the side airbag and the diffuser are inflated and expanded. Due thereto, damage to the side airbag by the protecting portion is mitigated in a case in which the vehicle occupant of that seat (the seat in which the far side airbag device for a vehicle of the present aspect is provided) or of another seat, who has been pushed-against the side airbag accompanying a vehicle collision, interferes with the gas supplying end portion via the side airbag. Accordingly, a decrease in the restraining force of the side airbag with respect to the vehicle occupant is suppressed.

In a far side airbag device for a vehicle relating to a second aspect of the present invention, in the above-described first aspect, the protecting portion includes a protecting patch that is provided along the diffuser, is inflated and expanded together with the diffuser, and covers the gas supplying end portion.

In accordance with the far side airbag device for a vehicle relating to the second aspect, the protecting patch is provided at the diffuser. Accompanying the inflation and expansion of the diffuser, this protecting patch, together with the diffuser, covers the gas supplying end portion of the inflator. In this state, when the vehicle occupant of that seat or of another seat, who has been pushed-against the side airbag accompanying a vehicle collision, approaches the gas supplying end portion, that vehicle occupant is made to interfere with the gas supplying end portion via the side airbag, the diffuser and the protecting patch. Namely, the protecting patch is interposed between the gas supplying end portion and the side airbag. Due thereto, damage to the side airbag by the gas supplying end portion is reduced.

Further, for example, by utilizing a structure in which the protecting patch is provided at the inner peripheral surface of the diffuser, the protecting patch is interposed between the gas supplying end portion and the diffuser. Due thereto, damage to the diffuser by the gas supplying end portion also is mitigated.

In a far side airbag device for a vehicle relating to a third aspect of the present invention, in the above-described first aspect or second aspect, the protecting portion includes a protecting cap that is put on the gas supplying end portion and that has an opening through which gas passes.

In accordance with the far side airbag device for a vehicle relating to the third aspect, the protecting cap is put on the gas supplying end portion of the inflator. In this state, when the vehicle occupant of that seat or of another seat, who has been pushed-against the side airbag accompanying a vehicle collision, approaches the gas supplying end portion, that vehicle occupant is made to interfere with the gas supplying end portion via the side airbag, the diffuser and the protecting cap. Namely, the protecting cap is interposed between the gas supplying end portion and the side airbag. Due thereto, damage to the side airbag by the gas supplying end portion is mitigated.

Further, the protecting cap has the opening for gas. Gas, that is jetted-out from the gas supplying end portion, is supplied through this opening to the interior of the diffuser. Accordingly, a decrease in the inflation and expansion efficiency of the diffuser and the side airbag is suppressed.

In a far side airbag device for a vehicle relating to a fourth aspect of the present invention, in the above-described third aspect, the protecting cap is mounted to the gas supplying end portion in a state in which a gap is formed between the protecting cap and the gas supplying end portion.

In accordance with the far side airbag device for a vehicle relating to the fourth aspect, the protecting cap is mounted to the gas supplying end portion in a state in which a gap is formed between the protecting cap and the gas supplying end portion. Due thereto, in a case in which the vehicle occupant of that seat or of another seat, who has been pushed-against the side airbag accompanying a vehicle collision, interferes with the protecting cap, the protecting cap is crushed toward the side of the gap between the gas supplying end portion and the protecting cap. Energy is thereby absorbed. Accordingly, damage to the side airbag by the gas supplying end portion is further mitigated.

In a far side airbag device for a vehicle relating to a fifth aspect of the present invention, in any one of the above-described first aspect through fourth aspect, the protecting portion includes a back board side portion of a seat back board that circles around from a back surface side of the seat back toward a vehicle transverse direction central side of the gas supplying end portion.

In accordance with the far side airbag device for a vehicle relating to the fifth aspect, the seat back board is disposed at the back surface side of the seat back. The back board side portion at the vehicle transverse direction central side of the seat back board circles-around from the back surface side of the seat back toward the vehicle transverse direction central side of the gas supplying end portion of the inflator. Due to the vehicle occupant of that seat or of another seat, who approaches the gas supplying end portion from the vehicle transverse direction central side accompanying a vehicle collision, being received by this back board side portion, interference of the side airbag with the gas supplying end portion is suppressed. Accordingly, damage to the side airbag is mitigated.

Further, an increase in the number of parts is suppressed by using the back board side portion of the seat back board as the protecting portion.

A far side airbag device for a vehicle relating to a sixth aspect of the present invention has: an inflator that is provided at a vehicle transverse direction central-side side portion of a seat back along a height direction of the seat back, and that jets gas out from a jetting portion that is provided at a gas supplying end portion at an upper end side of the inflator; a side airbag that is provided at the vehicle transverse direction central-side side portion, has an interior that houses the inflator, and receives a supply of gas from the inflator and is thereby inflated and expanded; a diffuser that is housed at the interior of the side airbag, and that receives a supply of gas from the inflator and is thereby inflated and expanded in a shape of a tube that surrounds the inflator; and a protecting portion that is formed at the gas supplying end portion, and at which an angled edge of the gas supplying end portion is chamfered into a curved surface.

In accordance with the far side airbag device for a vehicle relating to the sixth aspect, the protecting portion is formed at the gas supplying end portion. This protecting portion is formed by the angled edge of the gas supplying end portion being chamfered into a curved surface. Due to the vehicle occupant of that seat or of another seat, who has been pushed-against the side airbag accompanying a vehicle collision, being received by this protecting portion, damage to the side airbag by the gas supplying end portion is mitigated as compared with a case in which there is an angled edge at the gas supplying end portion.

Further, by eliminating or reducing the angled edge at the gas supplying end portion that is a cause of damage to the side airbag, damage to the side airbag by the gas supplying end portion is mitigated more reliably.

In a far side airbag device for a vehicle relating to a seventh aspect of the present invention, in any one of the above-described first aspect through sixth aspect, the inflator has an inflator main body portion that extends along a height direction of the seat back, the jetting portion has jetting holes that jet gas out, and the jetting portion projects out in a shape of a protrusion from an upper surface of the inflator main body portion, and forms a step portion between the jetting portion and the inflator main body portion, and the gas supplying end portion includes the jetting portion and the step portion.

In accordance with the far side airbag device for a vehicle relating to the seventh aspect, the jetting portion projects-out in the shape of a projection from the upper surface of the inflator main body portion, and a step portion is formed between the jetting portion and the inflator main body portion. The side airbag is easily damaged when the vehicle occupant of that seat or of another seat interferes, via the side airbag, with a gas supplying end portion that includes such a jetting portion and a step portion. The present aspect is particularly effective in cases in which the jetting portion projects-out in the shape of a projection from the upper surface of the inflator main body portion in this way.

As described above, in accordance with the far side airbag device for a vehicle relating to the present invention, damage to the side airbag by the gas supplying end portion can be mitigated.

BRIEF DESCRIPTION OF THE DRAWINGS

Exemplary embodiments of the present invention will be described in detail based on the following figures, wherein.

DETAILED DESCRIPTION

Far side airbag devices for a vehicle relating to embodiments of the present invention are described hereinafter with reference to the drawings. Note that arrow FR that is shown appropriately in the respective drawings indicates the vehicle longitudinal direction front side, arrow UP indicates the vehicle vertical direction upper side, and arrow OUT indicates the vehicle transverse direction outer side. Further, longitudinal, vertical, and left and right in the following description mean the longitudinal of the vehicle longitudinal direction, the vertical of the vehicle vertical direction, and the left and right in the vehicle transverse direction when facing toward the front side in the vehicle longitudinal direction, unless otherwise stated.

First Embodiment

A first embodiment is described first.

Figure 1:
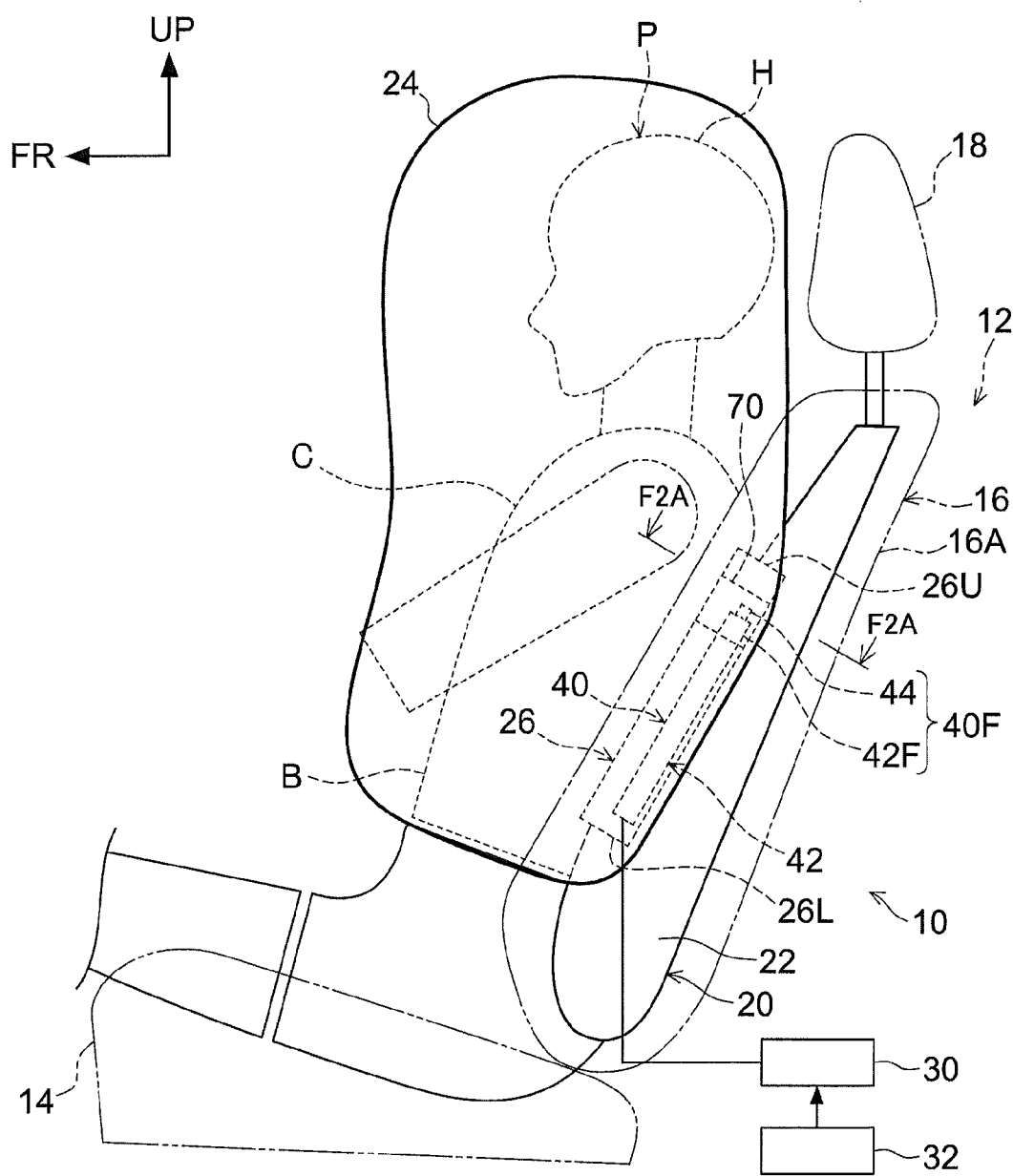
FIG. 1 is a side view showing a vehicle seat in which is installed a far side airbag device for a vehicle relating to a first embodiment.

A vehicle seat 12, in which is installed a far side airbag device for a vehicle (hereinafter called "FS airbag device") 10 relating to the first embodiment, is shown in FIG. 1. The vehicle seat 12 is, for example, the driver's seat of a right-hand drive vehicle. The vehicle seat 12 has a seat cushion 14, a seat back 16 that is reclinably supported at the rear end portion of the seat cushion 14, and a headrest 18 is provided at the upper end portion of the seat back 16.

Note that, in the present embodiment, the seat longitudinal direction, the seat transverse direction (the seat left-right direction) and the seat height direction of the vehicle seat 12 coincide with the vehicle longitudinal direction, the vehicle transverse direction and the vehicle vertical direction. Further, a state in which, instead of an actual vehicle occupant, a crash test dummy P is seated in the vehicle seat 12 shown in FIG. 1 is illustrated.

The dummy P is, for example, an AM50 (50th percentile U.S. adult male) World SID (internationally standardized side crash dummy: World Side Impact Dummy). This dummy P is seated in the vehicle seat 12 in a standard seated posture that is prescribed by the crash test method. Further, the longitudinal position of the seat cushion 14 with respect to the vehicle, and the inclined position (the angle of inclination) of the seat back 16 with respect to the seat cushion 14, are adjusted to reference set positions that correspond to the aforementioned seated posture. Hereinafter, in order to make the explanation easy to understand, the dummy P is called the "vehicle occupant P" of that seat or the "driver's seat vehicle occupant".

The seat back 16 has a seat back frame 20 that structures the skeleton of the seat back 16, an unillustrated seat back pad (cushion member) that is supported by the seat back frame 20, and an unillustrated seat skin that covers the surface of the seat back pad. The seat back 16 has a pair of side support portions 16A that are disposed at the seat transverse direction both sides.

The seat back frame 20 has a pair of side frames 22 that are provided at the side support portions 16A of the both sides of the seat back 16. The pair of side frames 22 extend in the seat height direction along the side support portions 16A, and are disposed so as to face one another in the seat transverse direction. Note that FIG. 1 and FIG. 2A illustrate, of the pair of side frames 22, the side frame 22 that is provided at the side support portion 16A that is at the vehicle transverse direction central side of the seat back 16 (the vehicle transverse direction central-side side portion: hereinafter simply called "central-side side portion 16A").

Figure 2A:
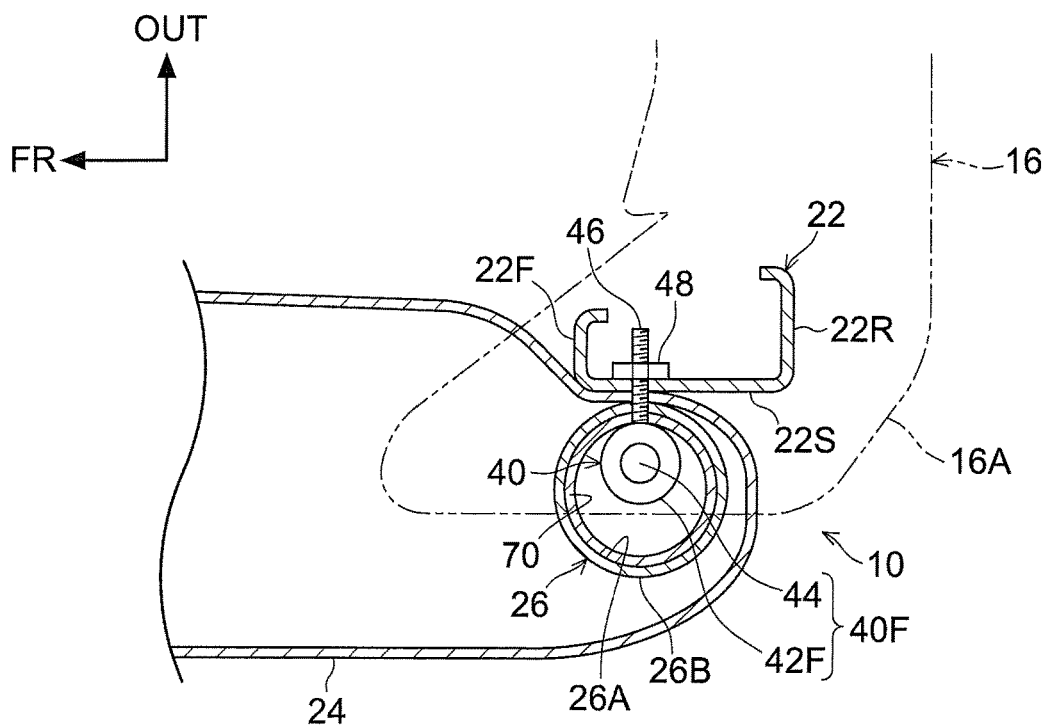
FIG. 2A is an enlarged sectional view showing, in an enlarged manner, the cross-section cut along line F2A-F2A of FIG. 1.

As shown in FIG. 2A, the side frame 22 is formed in a C-shape in cross-section whose seat transverse direction inner side is open. The side frame 22 has a side wall portion 22S that is disposed along the seat longitudinal direction at the seat transverse direction outer side, a front wall portion 22F the extends-out toward the seat transverse direction inner side from the front end portion of the side wall portion 22S, and a rear wall portion 22R that extends-out toward the seat transverse direction inner side from the rear end portion of the side wall portion 22S. An inflator 40 and the like of the FS airbag device 10 that is described later are mounted to the side wall portion 22S of this side frame 22.

The FS airbag device 10 has a side airbag 24 (a far side airbag: a bag body), a diffuser 26, the inflator 40 that serves as a gas generating device, and a protecting patch 70. The side airbag 24 is housed at the interior of the central-side side portion 16A in a state of being folded-up together with the diffuser 26 and the protecting patch 70. The side airbag 24 is formed in the shape of an elongated bag due to a base cloth, that is formed by cutting-out a nylon or polyester cloth material for example, being folded in two and the outer peripheral edge portion being sewn.

As shown in FIG. 1, the side airbag 24 receives a supply of gas from the inflator 40, and is inflated and expanded toward the vehicle transverse direction central side with respect to the vehicle occupant P (the front side of the central-side side portion 16A). Note that, at the time when the side airbag 24 is inflated and expanded, the seat back pad and the seat skin (neither of which is shown) that are disposed at the central-side side portion 16A receive the inflation pressure of the side airbag 24 and are broken (ruptured).

Further, when the inflated and expanded state of the side airbag 24 is viewed from the side surface side (here, the vehicle transverse direction central side), the side airbag 24 forms a substantially rectangular shape that is elongated along the vehicle vertical direction, and covers the vehicle occupant P from an abdominal portion B to a head portion H. Further, the upper portion (head portion protecting area) of the side airbag 24, that restrains (protects) the head portion H of the vehicle occupant P, has a larger volume than an intermediate portion of the side airbag 24 that restrains a chest portion C of the vehicle occupant P.

Note that it suffices for the side airbag 24 to be inflated and expanded so as to cover at least the region from the chest portion C to the head portion H of the vehicle occupant P, from the vehicle transverse direction central side. Further, unless otherwise stated, the longitudinal and vertical directions of the side airbag 24 in the following description mean the directions in the state in which the side airbag 24 has inflated and expanded, and substantially coincide with the longitudinal and vertical directions of the vehicle.

The diffuser 26 and the inflator 40 are housed in the lower portion side and the rear end side of the interior of the side airbag 24. The diffuser 26 is a member that is called a loop diffuser, an inner tube, a flow directing cloth, or the like, and is formed by a base cloth, that is formed by cutting-out, in a rectangular shape, a cloth material that is similar to that of the base cloth of the side airbag 24, being sewn in the form of a cylindrical tube. Note that the material of the diffuser 26 is not limited to a cloth material such as described above, and a sheet-like material that is flexible can be used therefor.

At the interior of the side airbag 24, the diffuser 26 receives a supply of gas from the inflator 40, and is inflated and expanded in the shape of a tube that surrounds the inflator 40. The diffuser 26 is disposed such that the axial direction thereof runs along the height direction of the seat back 16. Further, the diffuser 26 has an upper end opening 26U that is formed at the upper end, and a lower end opening 26L that is formed at the lower end. The diffuser 26 functions to distribute, upward and downward, the gas that is jetted-out from the inflator 40. Further, the protecting patch 70 that is described later is provided at an inner peripheral surface 26A of the diffuser 26.

The inflator 40 is a so-called cylinder-type gas generating device. The inflator 40 is disposed along the height direction of the seat back 16 (the seat height direction). Further, the axial direction dimension of the inflator 40 is made to be slightly shorter than that of the diffuser 26. The inflator 40 is housed at the inner side of the diffuser 26 in a posture in which the axial direction of the inflator 40 runs along the axial direction of the diffuser 26.

An ECU 30, that serves as a control section (control device) and that is installed in the vehicle, is electrically connected to the lower end portion of the inflator 40. A side collision sensor 32 that senses a side collision of the vehicle is electrically connected to this ECU 30. Note that the ECU 30 and the side collision sensor 32 are structural members of the FS airbag device 10.

The ECU 30 is structured to operate (activate) the inflator 40 at the time of sensing (the inevitability of) a side collision of the vehicle on the basis of a signal from the side collision sensor 32. Note that, in a case in which a pre-crash sensor that forecasts (predicts) a side collision is electrically connected to the ECU 30, there may be a structure in which the inflator 40 is activated at the time when the ECU 30 forecasts a side collision on the basis of a signal from the pre-crash sensor.

When the inflator 40 is activated by the ECU 30, gas is jetted-out into the diffuser 26 from a jetting portion 44 (see FIG. 3) that is described later. At usual times, the diffuser 26 is folded-up together with the side airbag 24 and housed within the central-side side portion 16A. However, at the time when gas is jetted-out from the inflator 40 as described above, the diffuser 26 is inflated and expanded by the pressure of the gas in the form of a cylindrical tube so as to surround the inflator 40. Then, the gas that has been jetted-out from the inflator 40 is supplied from the upper end opening 26U of the diffuser 26 to the upper portion of the side airbag 24, and is supplied from the lower end opening 26L of the diffuser 26 to the lower end side of the side airbag 24. Due thereto, the side airbag 24 is stably inflated and expanded in a predetermined shape.

The inflator 40 has an inflator main body portion 42 and the jetting portion 44. The inflator main body portion 42 is formed in the shape of a cylindrical tube, and, in the same way as the diffuser 26, is disposed along the height direction of the seat back 16.

As shown in FIG. 2A, a pair of upper and lower stud bolts 46 that project-out toward the seat transverse direction inner side are provided at the inflator main body portion 42. Note that, among the pair of upper and lower stud bolts 46, the stud bolt 46 that is at the upper side is illustrated in FIG. 2A. Nuts 48 are fastened to the distal end sides of the stud bolts 46 in a state in which the respective stud bolts 46 have been passed-through the protecting patch 70 that is described later, the base cloth of the diffuser 26, the base cloth of the side airbag 24, and the side wall portion 22S of the side frame 22. Due thereto, the inflator 40 is, together with the side airbag 24, the diffuser 26 and the protecting patch 70, fixed to the side frame 22.

The jetting portion 44 projects-out in the shape of a projection from central portion at an upper surface 42U of the inflator main body portion 42. This jetting portion 44, together with an upper end portion 42F of the inflator main body portion 42, forms an upper end portion 40F of the inflator 40 (hereinafter, this upper end portion is called the "gas supplying end portion"). Namely, the gas supplying end portion 40F of the inflator 40 is formed to include the jetting portion 44 and the upper end portion 42F of the inflator main body portion 42. This gas supplying end portion 40F is positioned at a height direction intermediate portion of the seat back 16. Note that what is called height direction intermediate portion of the seat back 16 here means, for example, the central region in a case in which the seat back 16 is divided into three equal regions in the height direction.

Figure 3:
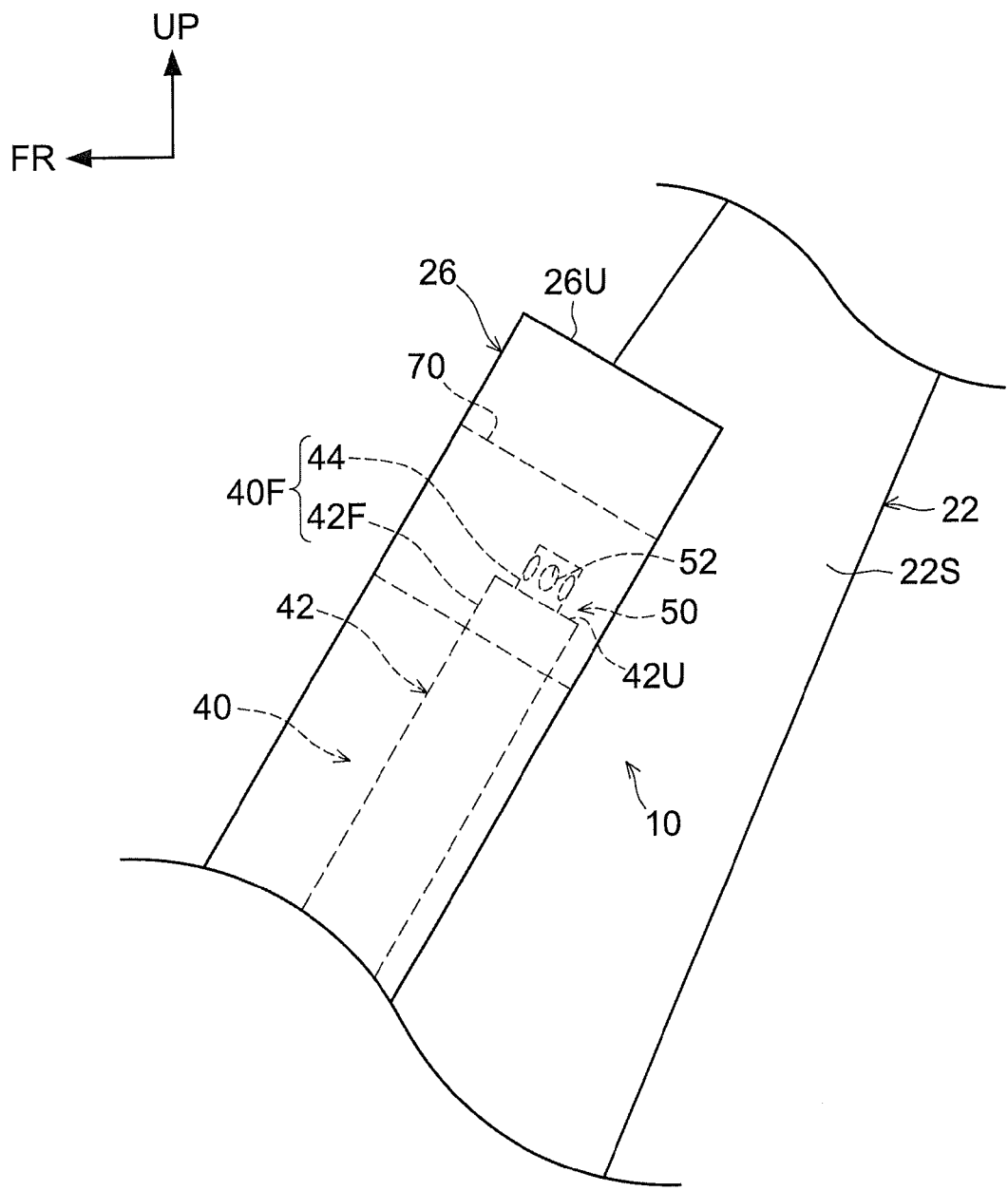
FIG. 3 is an enlarged side view showing, in an enlarged manner, the protecting patch shown in FIG. 1.

The jetting portion 44 is formed in the shape of a cylindrical tube whose diameter is smaller than that of the inflator main body portion 42, and is disposed substantially coaxially with the inflator main body portion 42. Due thereto, as shown in FIG. 3, a step portion 50 that extends over the entire periphery is formed between the jetting portion 44 and the inflator main body portion 42. Further, plural jetting holes 52, that jet gas out toward the radial direction outer side, are formed in a side peripheral surface 44S (see FIG. 12A) of the jetting portion 44. The plural jetting holes 52 are arrayed with an interval therebetween in the peripheral direction of the jetting portion 44.

Here, the protecting patch 70 is provided at the upper portion of the diffuser 26. The protecting patch 70 is formed in the shape of a belt from, for example, a cloth material that is thicker than the diffuser 26 or a sheet material made of resin that is thicker than the diffuser 26, and is sewn to the inner peripheral surface 26A of the diffuser 26. Note that the protecting patch 70 is housed in the interior of the central-side side portion 16A in a state in which the protecting patch 70 is folded-up together with the diffuser 26.

The protecting patch 70 is formed in the shape of a tube along the inner peripheral surface 26A of the diffuser 26 that has inflated and expanded, so as to surround the entire periphery of the gas supplying end portion 40F. Namely, in the state in which the diffuser 26 has inflated and expanded, the protecting patch 70 is interposed between the gas supplying end portion 40F and the diffuser 26. Further, this is a structure in which, in a case in which the vehicle occupant (head portion) of that seat or of another seat, that has been pushed-against the side airbag 24 accompanying a vehicle collision, approaches the gas supplying end portion 40F, that vehicle occupant is made to interfere with the gas supplying end portion 40F via the protecting patch 70.

Operation of the first embodiment is described next.

Figure 4A:
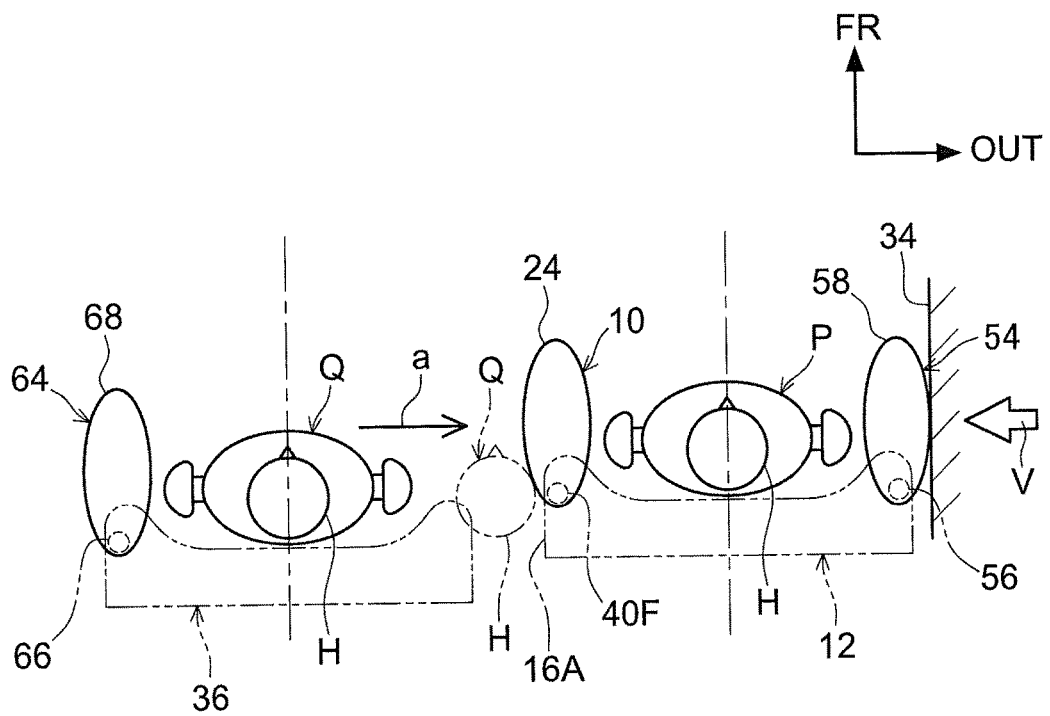
FIG. 4A is a plan view in which the situation within a vehicle cabin in the initial stage of a side collision with respect to a right side of a vehicle, is seen from an upper side of the vehicle.

The vehicle seat (hereinafter also called "driver's seat") 12, that is disposed at the right side with respect to the vehicle transverse direction center of the vehicle, is shown in FIG. 4A. The aforementioned vehicle occupant (hereinafter also called "driver's seat vehicle occupant") P is seated in this driver's seat 12. The FS airbag device 10 relating to the present embodiment is installed in the central-side side portion 16A of the driver's seat 12. Further, a near side airbag device for a vehicle (hereinafter called "NS airbag device") 54 is installed in the outer-side side portion (side support portion) at the vehicle transverse direction outer side of the driver's seat 12. The NS airbag device 54 has an inflator 56 and a side airbag 58. The side airbag 58 receives a supply of gas from the inflator 56, and is inflated and expanded so as to cover at least the region from the abdominal portion to the shoulder portion of the driver's seat vehicle occupant P from the vehicle transverse direction outer side. Note that a front side door 34 is disposed at the vehicle transverse direction outer side (the right side) of the driver's seat 12.

On the other hand, a vehicle seat (hereinafter also called "front passenger's seat") 36 is disposed at the left side with respect to the vehicle transverse direction center of the vehicle. A dummy (hereinafter called the "vehicle occupant" of the other seat or the "front passenger's seat vehicle occupant") Q, that is similar to the driver's seat vehicle occupant P, is seated in this front passenger's seat 36. A near side airbag device for a vehicle (hereinafter called "NS airbag device") 64 is installed in the outer-side side portion (side support portion) at the vehicle transverse direction outer side of this front passenger's seat 36. The NS airbag device 64 has an inflator 66 and a side airbag 68. The side airbag 68 receives a supply of gas from the inflator 66, and is inflated and expanded so as to cover at least the region from the abdominal portion to the shoulder portion of the front passenger's seat vehicle occupant Q from the vehicle transverse direction outer side. The front passenger's seat 36 is disposed so as to be offset toward the rear side with respect to the driver's seat 12, and the front passenger's seat vehicle occupant Q and the inflator 40 of the FS airbag device 10 are lined-up in the vehicle transverse direction. Note that the front passenger's seat 36 differs from the driver's seat 12 with regard to the point that the FS airbag device 10 is not installed at the front passenger's seat 36.

In this state, when the side collision sensor 32 predicts a side collision (arrow V) with respect to the front side door 34 at the right side of the vehicle for example, as shown in FIG. 1, the ECU 30 operates the inflator 40 of the FS airbag device 10. When the inflator 40 is operated, gas is jetted-out from the jetting portion 44 of the inflator 40, and the gas is supplied via the diffuser 26 to the interior of the side airbag 24.

Due thereto, the side airbag 24 is inflated and expanded over the region from the abdominal portion B to the head portion H of the driver's seat vehicle occupant P, at the vehicle transverse direction central side of the driver's seat vehicle occupant P. At this time, due to the gas, that is jetted-out from the jetting portion 44 of the inflator 40, being directed to flow upward and downward by the diffuser 26, the side airbag 24 is stably inflated and expanded in a predetermined shape.

Further, when the side collision sensor 32 senses a side collision (arrow V), the ECU 30 operates the inflators 56, 66 of the NS airbag devices 54, 64, respectively. Due thereto, the side airbag 58 is inflated and expanded at the vehicle transverse direction outer side of the driver's seat vehicle occupant P, and the side airbag 68 is inflated and expanded at the vehicle transverse direction outer side of the front passenger's seat vehicle occupant Q. Note that, in a case in which the front passenger's seat vehicle occupant Q is not seated in the front passenger's seat 36, basically, the inflator 66 of the NS airbag 64 is not operated and the side airbag 68 is not inflated and expanded.

In this state, the driver's seat vehicle occupant P in the driver's seat 12 is moved toward the collision side (the front side door 34 side) accompanying the side collision (arrow V), and is pushed-against and restrained by the side airbag 58 of the NS airbag device 54. Thereafter, the driver's seat vehicle occupant P moves toward the side opposite the collision side due to the swinging-back (reaction) due to the side airbag 58. Due thereto, the driver's seat vehicle occupant P is pushed-against and restrained by the side airbag 24 of the FS airbag device 10.

Here, as shown in FIG. 1, the upper portion of the side airbag 24 that restrains (protects) the head portion H of the driver's seat vehicle occupant P has a larger volume than that of the intermediate portion of the side airbag 24 that restrains the chest portion C of the driver's seat vehicle occupant P, and there is the possibility that more time will be required for the inflation and expansion than at the intermediate portion. As a countermeasure thereto, in the present embodiment, the jetting portion 44 is provided at the gas supplying end portion 40F that is at the upper end side of the inflator 40. Due thereto, as compared with a case in which the jetting portion 44 is provided at the lower end portion of the inflator 40, the upper portion of the side airbag 24 can be inflated and expanded at an early stage at the vehicle transverse direction central side with respect to the head portion H of the driver's seat vehicle occupant P. Accordingly, at the time of a side collision, the head portion H of the driver's seat vehicle occupant P can be restrained more reliably by the upper portion of the side airbag 24.

Further, the inflator 40 is provided along the height direction of the seat back 16. The gas supplying end portion 40F of the inflator 40 is positioned at the intermediate portion in the seat height direction of the seat back 16. Therefore, when, for example, accompanying a side collision, the front passenger's seat vehicle occupant Q of the front passenger's seat 36 moves toward the collision side (the arrow a direction) as shown by the two-dot chain line in FIG. 4A, there is the possibility that the head portion H of the front passenger's seat vehicle occupant Q will be pushed-against the side airbag 24 of the FS airbag device 10 and will interfere with the gas supplying end portion 40F via the side airbag 24.

Further, as shown in FIG. 3, the jetting portion 44 that jets-out gas is provided at the gas supplying end portion 40F. The jetting portion 44 projects-out in the shape of a projection from the upper surface 42U of the inflator main body portion 42 of the inflator 40, and forms the step portion 50 between the jetting portion 44 and the upper end portion 42F of the inflator main body portion 42. If there are angled edges for example at the upper edge portion of the jetting portion 44 and at the step portion 50, there is the possibility that the side airbag 24 will be damaged when the head portion H of the front passenger's seat vehicle occupant Q of the other seat interferes with the gas supplying end portion 40F via the side airbag 24.

As a countermeasure thereto, in the present embodiment, the protecting patch 70 is provided at the inner peripheral surface 26A of the diffuser 26. Accompanying the inflation and expansion of the diffuser 26, this protecting patch 70 inflates and expands, and, together with the diffuser 26, covers the gas supplying end portion 40F of the inflator 40. In this state, when the head portion H (see FIG. 4A) of the front passenger's seat vehicle occupant Q of the other seat, that has been pushed-against the side airbag 24 at the time of a side collision, approaches the gas supplying end portion 40F, the head portion H of this front passenger's seat vehicle occupant Q is made to interfere with the gas supplying end portion 40F via the side airbag 24, the diffuser 26 and the protecting patch 70. Namely, the protecting patch 70 is interposed between the gas supplying end portion 40F and the side airbag 24. Due thereto, damage to the side airbag 24 by the gas supplying end portion 40F is mitigated. Accordingly, a decrease in the restraining force of the side airbag 24 with respect to the driver's seat vehicle occupant P and the front passenger's seat vehicle occupant Q is suppressed. Further, effects of the gas supplying end portion 40F on the front passenger's seat vehicle occupant Q also are mitigated.

Further, by providing the protecting patch 70 at the inner peripheral surface 26A of the diffuser 26, the protecting patch 70 is interposed between the diffuser 26 and the gas supplying end portion 40F. Due thereto, damage to the diffuser 26 by the gas supplying end portion 40F also is mitigated.

Moreover, by providing the protecting patch 70 along the inner peripheral surface 26A of the diffuser 26, it is difficult for the protecting patch 70 to obstruct the flow of gas at the interior of the diffuser 26. Accordingly, a deterioration in the inflation and expansion efficiency of the side airbag 24 is mitigated.

Figure 4B:
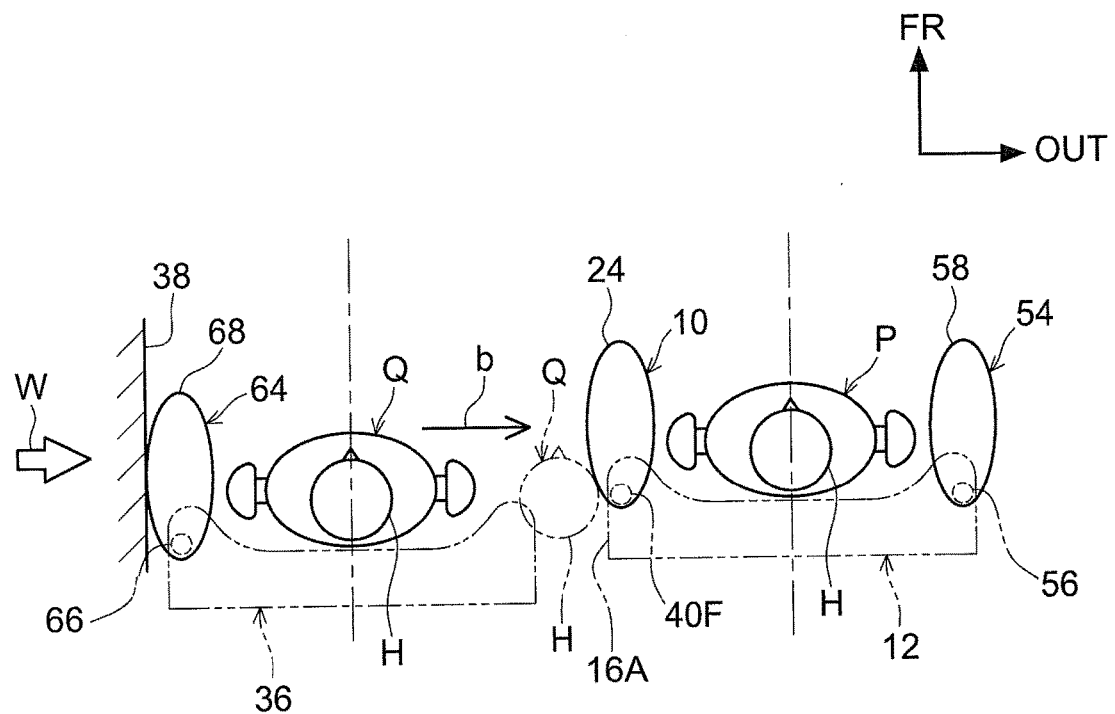
FIG. 4B is a plan view in which the situation within the vehicle cabin in the initial stage of a side collision with respect to a left side of the vehicle, is seen from the upper side of the vehicle.

Note that, in FIG. 4A, a side collision with respect to the front side door 34 at the right side of the vehicle is described as an example. However, the present embodiment is not limited to this. For example, as shown in FIG. 4B, the following occurs at the time of a side collision (arrow W) with respect to a front side door 38 that is at the left side of the vehicle. Namely, the ECU 30 (see FIG. 1) operates the inflator 40 of the FS airbag device 10, and operates the inflators 56, 66 of the NS airbag devices 54, 64, respectively. Due thereto, the respective side airbags 24, 58, 68 are inflated and expanded. Note that, as described above, in a case in which the front passenger's seat vehicle occupant Q is not seated in the front passenger's seat 36, basically, the inflator 66 of the NS airbag device 64 is not operated, and the side airbag 68 is not inflated and expanded.

In this state, the driver's seat vehicle occupant P is moved toward the collision side (the front side door 38 side) accompanying the side collision (arrow W), and is pushed-against the side airbag 24 of the FS airbag device 10 and restrained. Similarly, the front passenger's seat vehicle occupant Q is moved toward the collision side, and is pushed-against the side airbag 68 of the NS airbag device 64 and restrained. Thereafter, the front passenger's seat vehicle occupant Q moves toward the side (the arrow b direction in FIG. 4B) opposite the collision side due to the swinging-back (reaction) due to the side airbag 68.

At this time, there is the possibility that the head portion H of the front passenger's seat vehicle occupant Q will interfere with the gas supplying end portion 40F of the inflator 40 via the side airbag 24, as shown by the two-dot chain line. As a countermeasure thereto, it is thought to cover the gas supplying end portion 40F by the protecting patch 70 from the vehicle transverse direction central side, in the same way as in the above-described embodiment.

Figure 5:
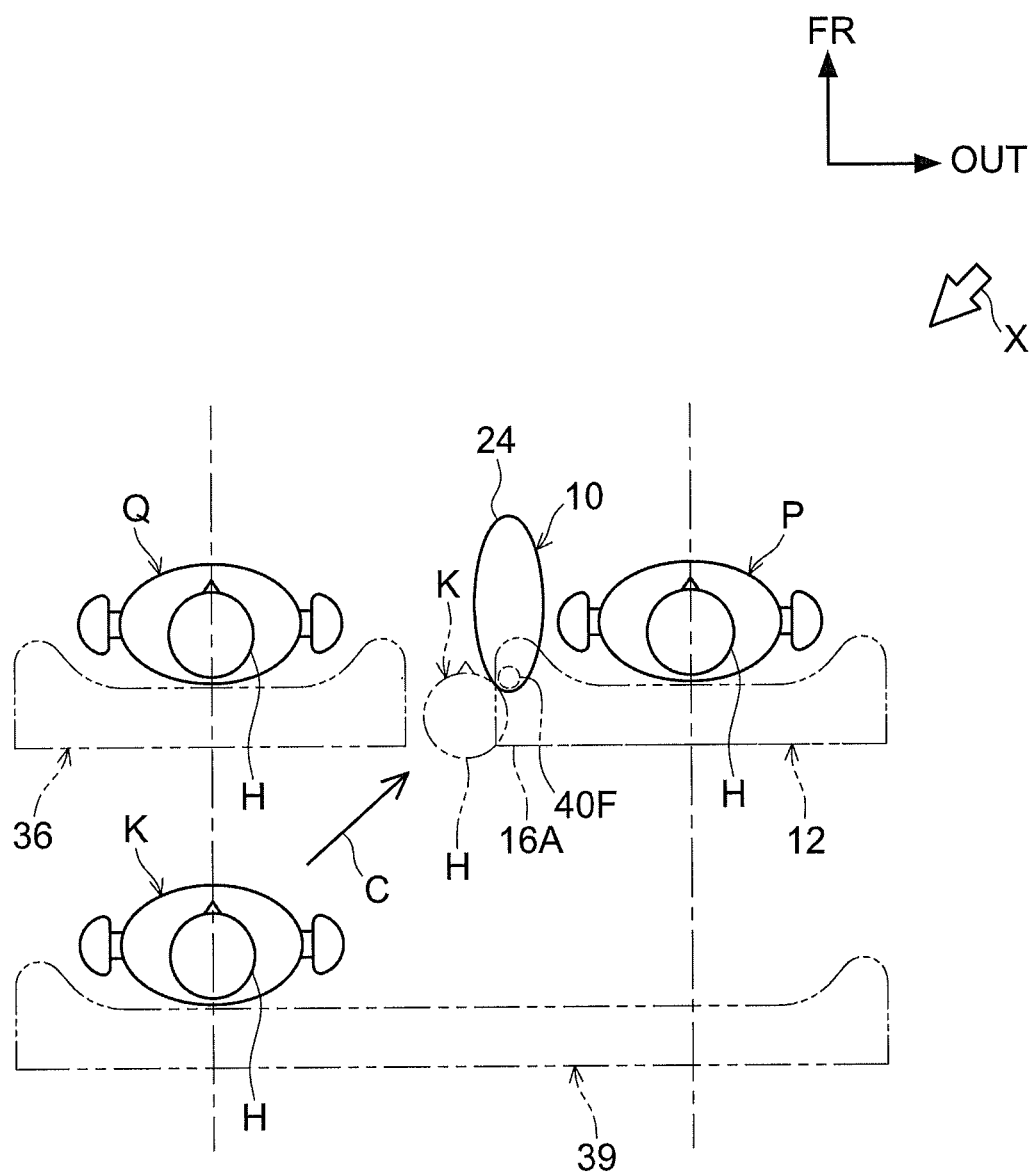
FIG. 5 is a plan view in which the situation within the vehicle cabin in the initial stage of an oblique collision with respect to a front surface of the vehicle, is seen from the upper side of the vehicle.

Further, for example, as shown in FIG. 5, in a front collision (arrow X) in which a collision body collides obliquely with the right side of the vehicle front surface, there is the possibility that a dummy (called "rear seat vehicle occupant") K, who is seated at the left side of a rear seat 39, will move toward the collision side (in the arrow c direction), and the head portion H of the rear seat vehicle occupant K will interfere with the gas supplying end portion 40F of the inflator 40 via the side airbag 24. As a countermeasure thereto, it is thought to cover the gas supplying end portion 40F from the rear side by the protecting patch 70.

Moreover, although not illustrated, in a case in which the front passenger's seat 36 is disposed so as to be offset toward the front side with respect to the driver's seat 12 and the inflator 40 is positioned obliquely to the rear of the front passenger's seat vehicle occupant Q, for example, when the head portion H of the front passenger's seat vehicle occupant Q of the other seat moves toward the collision side in a case in which a collision body collides obliquely from the rear with the right side of the vehicle rear surface, there is the possibility that the head portion H of that front passenger's seat vehicle occupant Q will interfere with the gas supplying end portion 40F of the inflator 40 via the side airbag 24. As a countermeasure thereto, it is thought to cover the gas supplying end portion 40F from the front side by the protecting patch 70.

Figure 6:
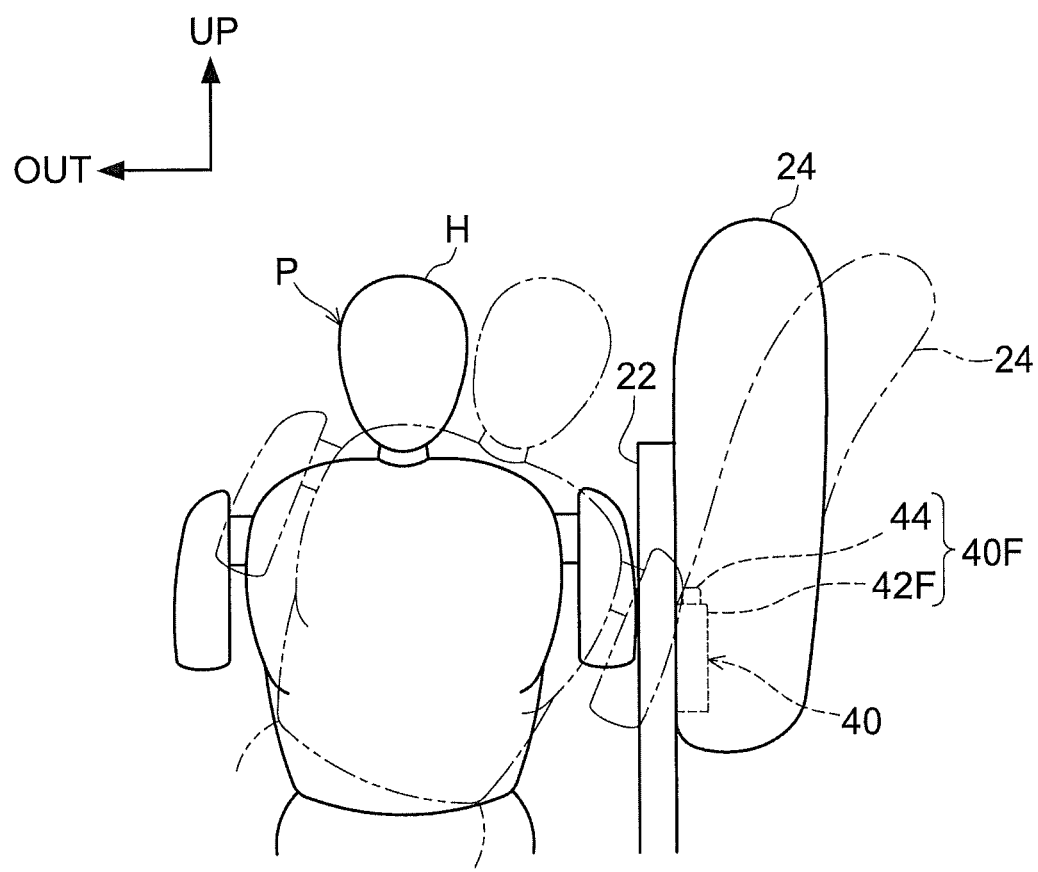
FIG. 6 is a front view showing a state in which a vehicle occupant, who is seated in the vehicle seat shown in FIG. 1, is tilted toward a vehicle transverse direction central side.

Moreover, as shown by the two-dot chain line in FIG. 6, when the driver's seat vehicle occupant P of the driver's seat 12 (that seat) is pushed-against the side airbag 24 that has inflated and expanded, and interferes with the gas supplying end portion 40F of the inflator 40 via the side airbag 24, there is the possibility that the side airbag 24 will bendingly deform toward the vehicle transverse direction central side with the gas supplying end portion 40F being the fulcrum. At this time, there is the possibility that the region of the side airbag 24 that interferes with the gas supplying end portion 40F will be damaged. As a countermeasure thereto, it is thought to cover the gas supplying end portion 40F by the protecting patch 70 from the seat transverse direction inner side (the vehicle transverse direction outer side).

Note that, in FIG. 4A, FIG. 4B, FIG. 5 and FIG. 6, the FS airbag device 10 is installed in the central-side side portion 16A of the driver's seat 12. However, the FS airbag device may be installed in the central-side side portion at the vehicle transverse direction central side of the front passenger's seat 36. In this case, the front passenger's seat vehicle occupant Q of the front passenger's seat 36 is the vehicle occupant of that seat, and the driver's seat vehicle occupant P of the driver's seat 12 is the vehicle occupant of the other seat.

Figure 2B:
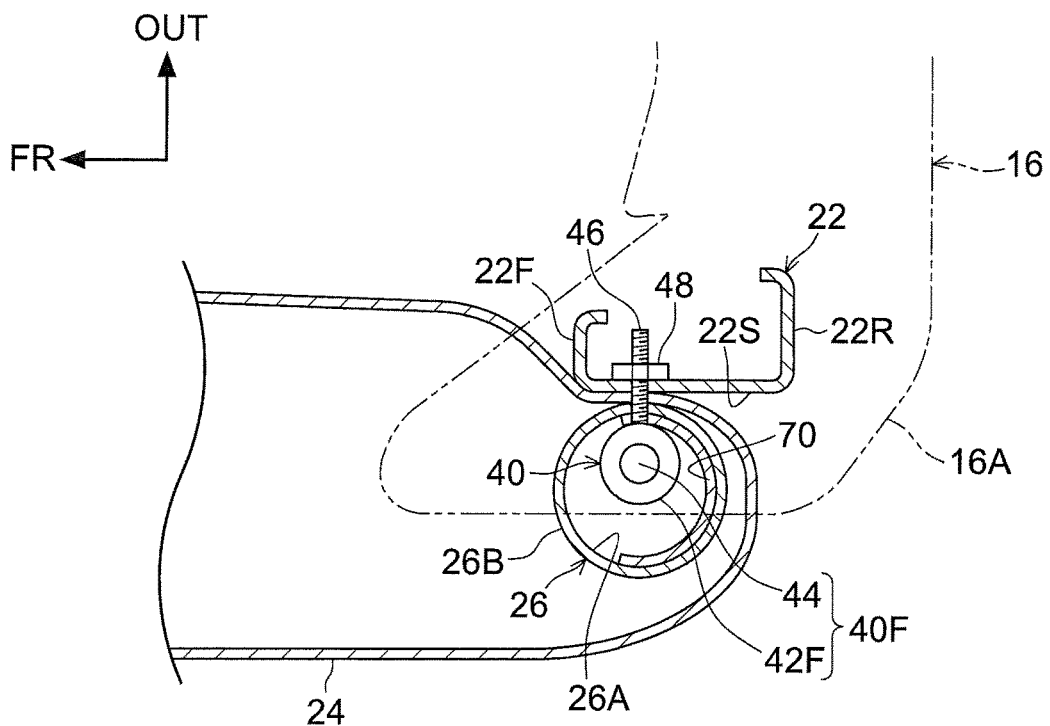
FIG. 2B is an enlarged sectional view that corresponds to FIG. 2A and shows a modified example of a protecting patch shown in FIG. 1.

Further, in the above-described embodiment, the protecting patch 70 is provided at the inner peripheral surface 26A of the diffuser 26 so as to cover the entire periphery of the gas supplying end portion 40F in the state in which the diffuser 26 and the protecting patch 70 have inflated and expanded. However, the present embodiment is not limited to this. For example, as shown in FIG. 2B, the protecting patch 70 may be provided at the inner peripheral surface 26A of the diffuser 26 so as to cover the substantial half periphery at the rear side of the gas supplying end portion 40F, in the state in which the diffuser 26 and the protecting patch 70 have inflated and expanded. In this case as well, in the collision forms that are illustrated in above-described FIG. 4A, FIG. 4B, FIG. 5 and FIG. 6, damage to the side airbag 24 by the gas supplying end portion 40F can be mitigated.

Further, the protecting patch 70 may be provided at the diffuser 26 so as to cover at least a portion of the gas supplying end portion 40F in the state in which the diffuser 26 has inflated and expanded. Further, the protecting patch 70 is not limited to being provided at the inner peripheral surface 26A of the diffuser 26, and may be provided at the outer peripheral surface of the diffuser 26.

Second Embodiment

A second embodiment is described next. Note that, in the following description, members and the like that are similar to those of the first embodiment are denoted by the same reference numerals, and description thereof is omitted.

Figure 7:
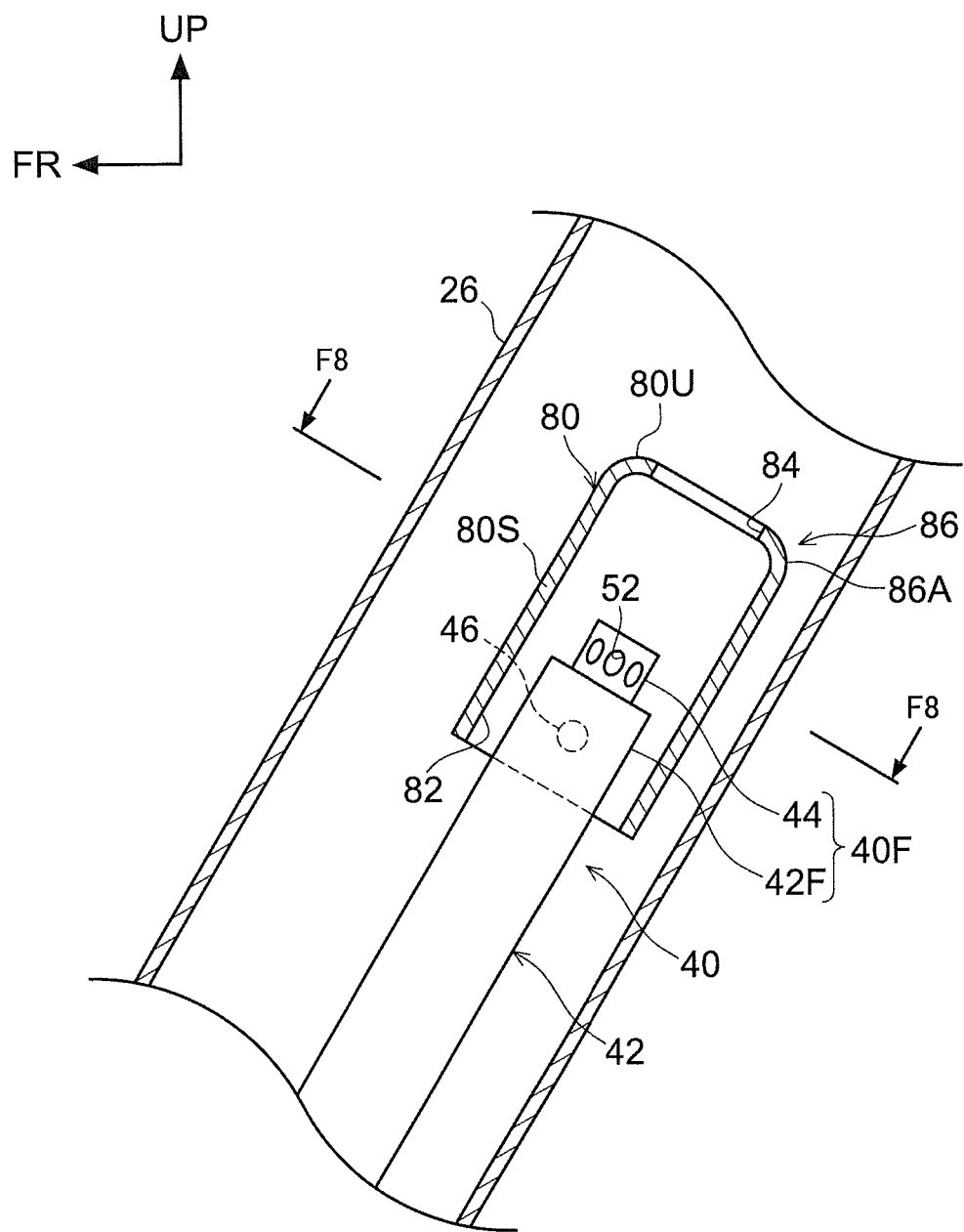
FIG. 7 is a vertical sectional view in which a protecting cap of a second embodiment is seen from the vehicle transverse direction central side.

As shown in FIG. 7, in the second embodiment, a protecting cap 80 is put on the gas supplying end portion 40F of the inflator 40. The protecting cap 80 that is an example of the protecting portion is formed of resin or metal or the like, in the shape of a tube whose diameter is larger than that of the inflator main body portion 42. An insertion opening 82 is formed at the lower end of the protecting cap 80. The gas supplying end portion 40F is inserted into the interior of the protecting cap 80 from this insertion opening 82.

An opening 84 for gas, through which gas passes, is formed in an upper surface 80U of the protecting cap 80. Due thereto, the gas that is jetted-out from the gas supplying end portion 40F is supplied via the opening 84 for gas to the interior of the diffuser 26.

Figure 9:
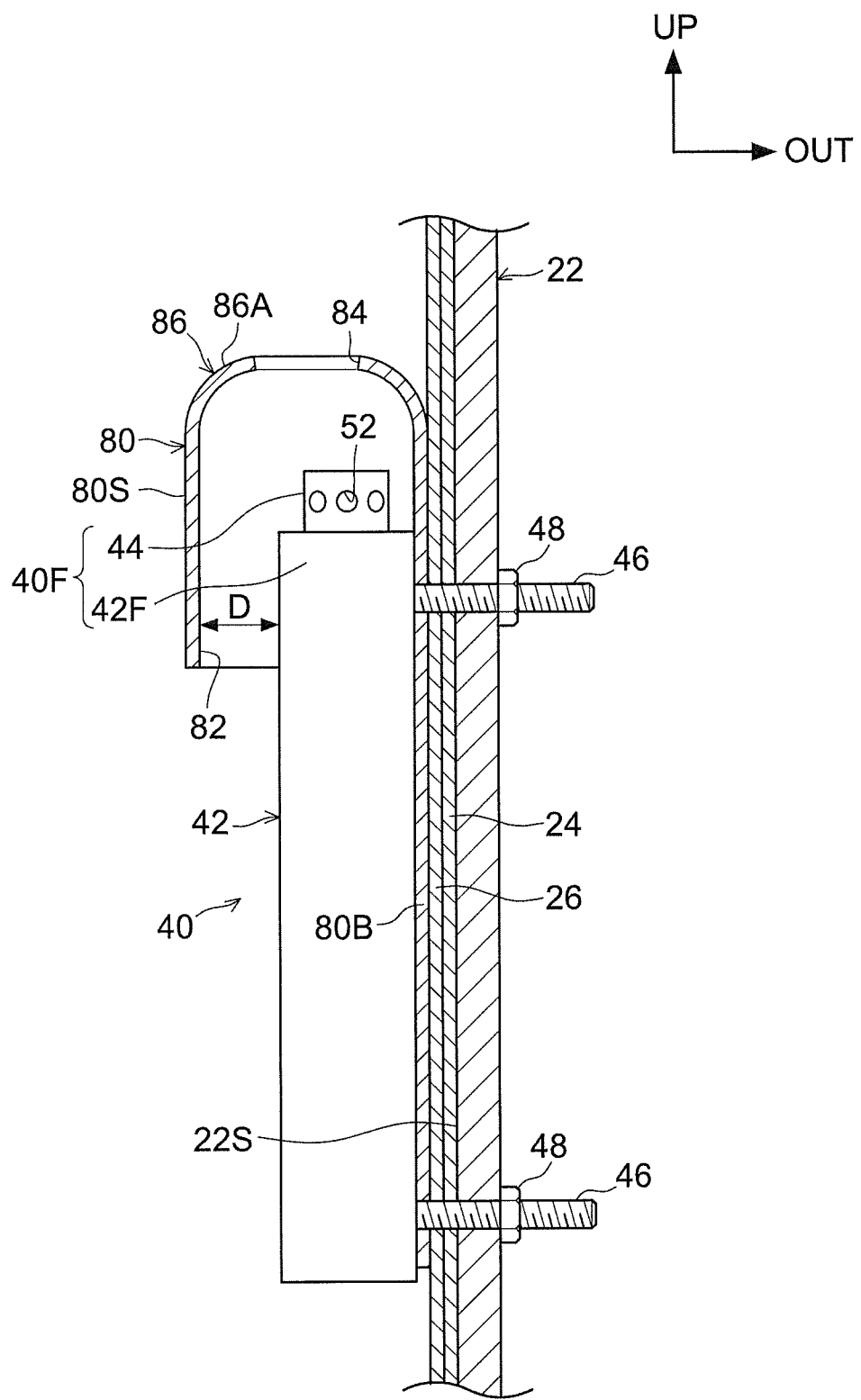
FIG. 9 is an enlarged vertical sectional view showing, in an enlarged manner, a modified example of the protecting cap shown in FIG. 7.

Further, as shown in FIG. 7 and FIG. 9, a rounded portion 86 is formed at the upper edge portion of the protecting cap 80 over the entire periphery thereof. This rounded portion 86 is formed by chamfering the angled edge of the upper edge portion of the protecting cap 80 into a curved surface (curvilinear surface) 86A. Due to the head portion H (see FIG. 4A) of the vehicle occupant Q of the other seat that has been pushed-against the side airbag 24 being received by the curved surface 86A of the rounded portion 86 and the side peripheral surface of the protecting cap 80, damage to the side airbag 24 that accompanies interference between the gas supplying end portion 40F and the side airbag 24 is mitigated.

Figure 8:
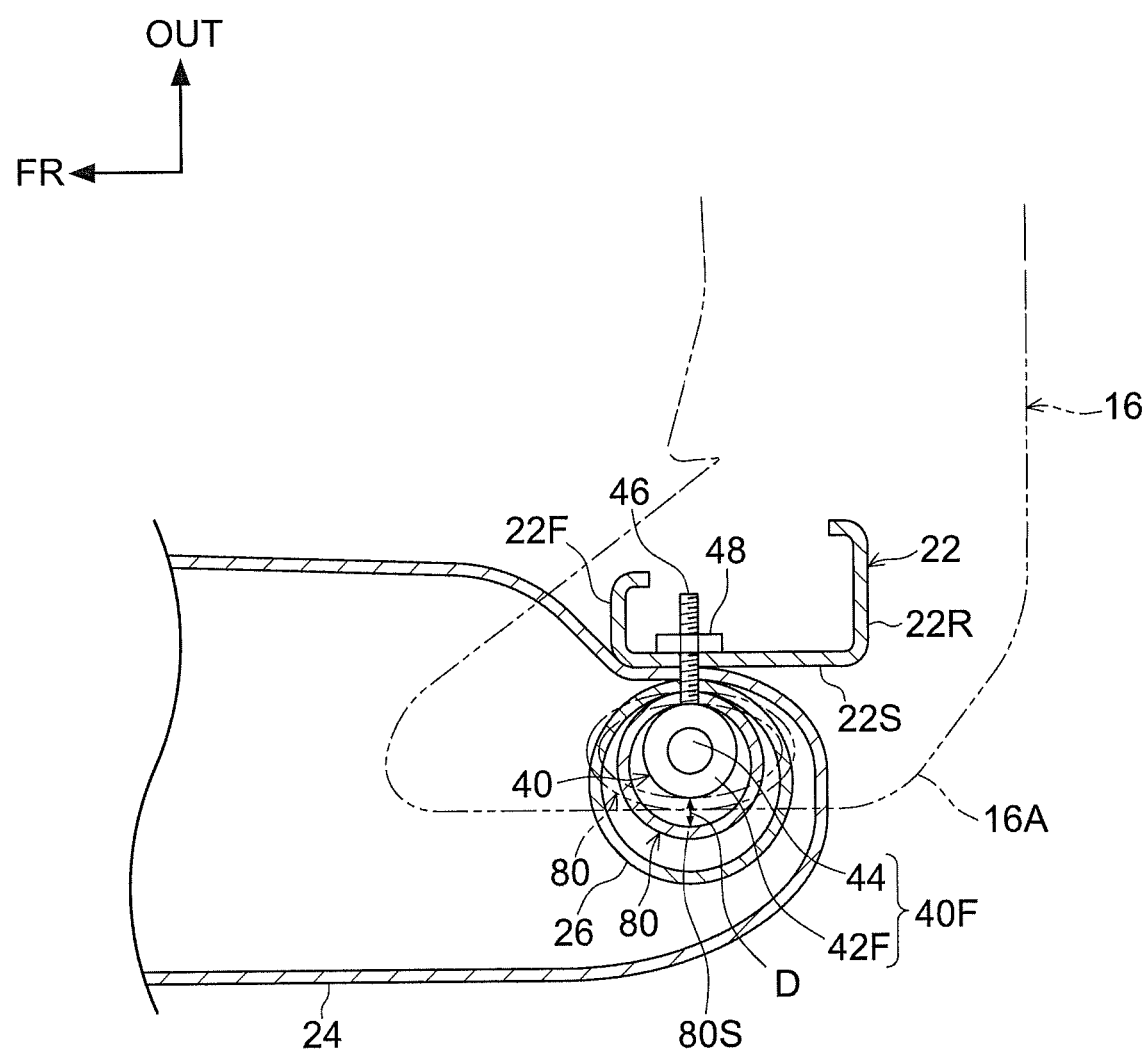
FIG. 8 is an enlarged sectional view showing, in an enlarged manner, the cross-section cut along line F8-F8 of FIG. 7.

Further, the protecting cap 80 is mounted to the gas supplying end portion 40F in a state in which a gap D is formed between the protecting cap 80 and the upper end portion 42F of the inflator main body portion 42 (the gas supplying end portion 40F). Concretely, as shown in FIG. 8, the gas supplying end portion 40F is inserted in the interior of the protecting cap 80 in a state of being offset toward the side frame 22 side at the protecting cap 80. Due thereto, the gap D is formed between the upper end portion 42F of the inflator main body portion 42 and a side wall portion 80S at the vehicle transverse direction central side of the protecting cap 80.

Further, the nut 48 is fastened to the distal end side of the stud bolt 46 at the upper side that projects-out from the gas supplying end portion 40F, in a state in which the stud bolt 46 passes-through the side wall portion 80S of the protecting cap 80, the base cloth of the diffuser 26, the base cloth of the side airbag 24, and the side wall portion 22S of the side frame 22. Due thereto, the protecting cap 80 is, together with the inflator 40, the side airbag 24 and the diffuser 26, fixed to the side frame 22 in a state in which the gap D is formed between the upper end portion 42F of the inflator main body portion 42 and the side wall portion 80S at the vehicle transverse direction central side of the protecting cap 80.

When, for example, external force of a predetermined value or more is inputted from the vehicle transverse direction central side to the protecting cap 80 that is mounted to the gas supplying end portion 40F in this way, the protecting cap 80 is crushed toward the gap D side as shown by the two-dot chain line, and energy is absorbed. Namely, the protecting cap 80 functions as an energy absorbing member. Note that it is preferable that the rigidity of the protecting cap 80 be lower than that of the gas supplying end portion 40F.

Operation of the second embodiment is described next.

The protecting cap 80 that serves as a protecting portion is put on the gas supplying end portion 40F of the inflator 40. In this state, when the head portion (see FIG. 4A) of the front passenger's seat vehicle occupant Q of the other seat, that has been pushed-against the side airbag 24 accompanying a vehicle collision, approaches the gas supplying end portion 40F, the head portion H of the front passenger's seat vehicle occupant Q interferes with the gas supplying end portion 40F via the side airbag 24, the diffuser 26 and the protecting cap 80. Namely, the protecting cap 80 is interposed between the gas supplying end portion 40F and the side airbag 24. Due thereto, damage to the side airbag 24 accompanying interference between the gas supplying end portion 40F and the side airbag 24 is mitigated. Accordingly, a decrease in the restraining force of the side airbag 24 with respect to the driver's seat vehicle occupant P and the front passenger's seat vehicle occupant Q is suppressed. Further, effects of the gas supplying end portion 40F on the front passenger's seat vehicle occupant Q also are mitigated.

Further, the rounded portion 86 is formed at the upper edge portion of the protecting cap 80. Damage to the side airbag 24 is further mitigated due to the side airbag 24 being received by the curved surface 86A of the rounded portion 86.

Furthermore, accompanying the interference between the protecting cap 80 and the head portion H of the front passenger's seat vehicle occupant Q of the other seat, the protecting cap 80 is crushed toward the gap D side as shown by the two-dot chain line in FIG. 8, and energy is absorbed. Due thereto, damage to the side airbag 24 by the gas supplying end portion 40F is further mitigated. Further, because energy is absorbed by deformation of the protecting cap 80, effects on the front passenger's seat vehicle occupant Q also are mitigated.

Further, the opening 84 for gas is formed in the upper surface 80U of the protecting cap 80. The gas that is jetted-out from the gas supplying end portion 40F is supplied through this opening 84 for gas to the interior of the diffuser 26. Accordingly, a decrease in the inflation and expansion efficiency of the diffuser 26 and the side airbag 24 due to the protecting cap 80 is reduced.

Note that, in the present embodiment, the protecting cap 80 is fixed to the side wall portion 22S of the side frame 22 by the stud bolt 46 at the upper side that projects-out from the gas supplying end portion 40F. However, the present embodiment is not limited to this. For example, as shown in FIG. 9, a flange portion 80B, that extends-out downward along the inflator 40, may be formed integrally with the lower end portion of the protecting cap 80. Then, this flange portion 80B may be fixed to the side wall portion 22S of the side frame 22 by the stud bolt 46 at the lower side of the inflator 40.

Due to the protecting cap 80 being fixed to the side frame 22 by the pair of upper and lower stud bolts 46 in this way, positional offset or the like of the protecting cap 80 with respect to the gas supplying end portion 40F is suppressed.

Further, in the present embodiment, the protecting cap 80 functions as an energy absorbing member. However, it is fine for the protecting cap 80 to not function as an energy absorbing member. Further, the size and shape of the protecting cap 80 can be changed as appropriate.

Third Embodiment

A third embodiment is described next. Note that, in the following description, members and the like that are similar to those of the first embodiment are denoted by the same reference numerals, and description thereof is omitted.

Figure 10:
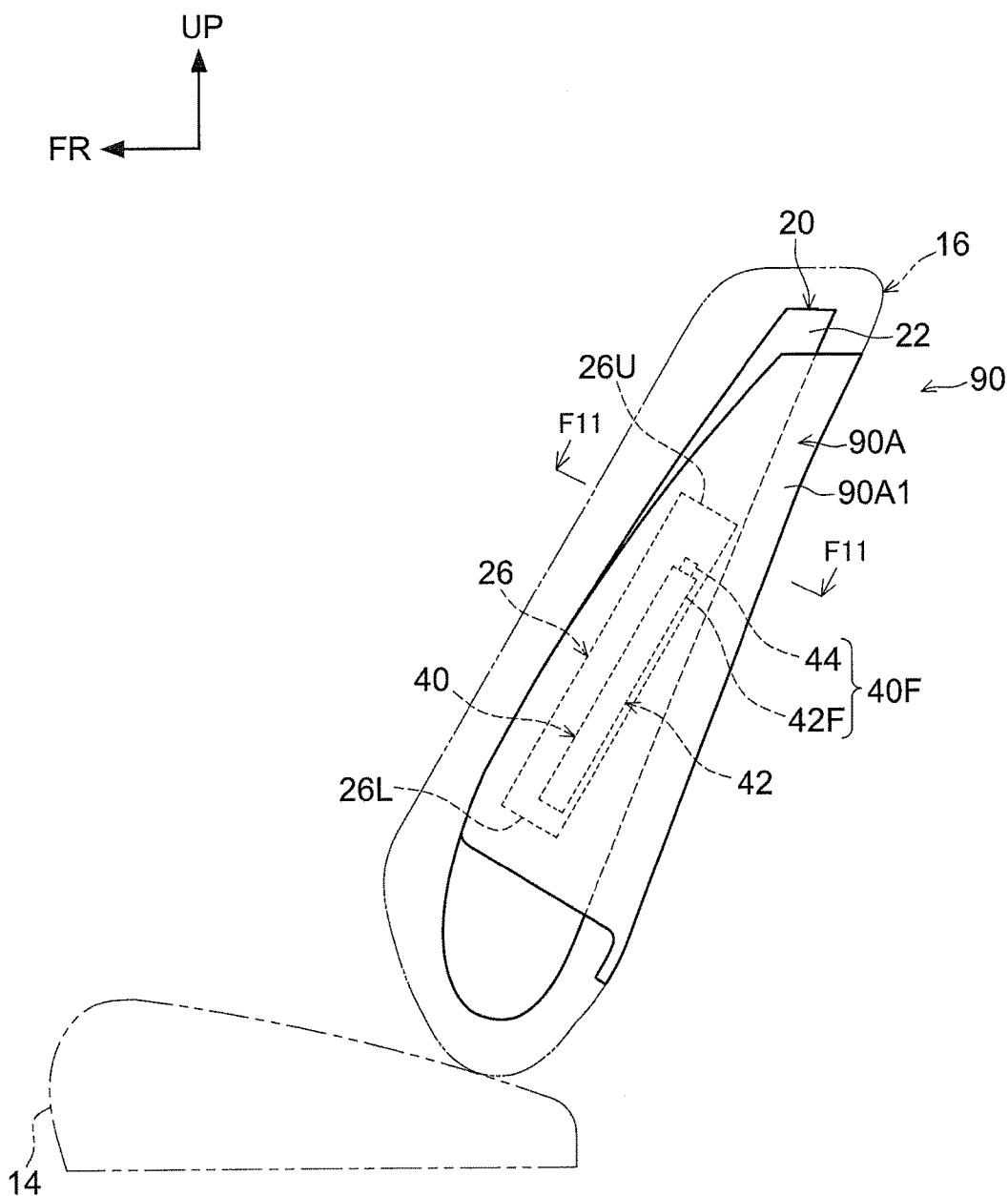
FIG. 10 is a side view showing the vehicle seat in which is installed the far side airbag device for a vehicle relating to a third embodiment.

As shown in FIG. 10, in the third embodiment, a seat back board 90 is disposed at the back surface side of the seat back 16. The seat back board 90 is formed in a plate shape of, for example, resin or the like.

Figure 11:
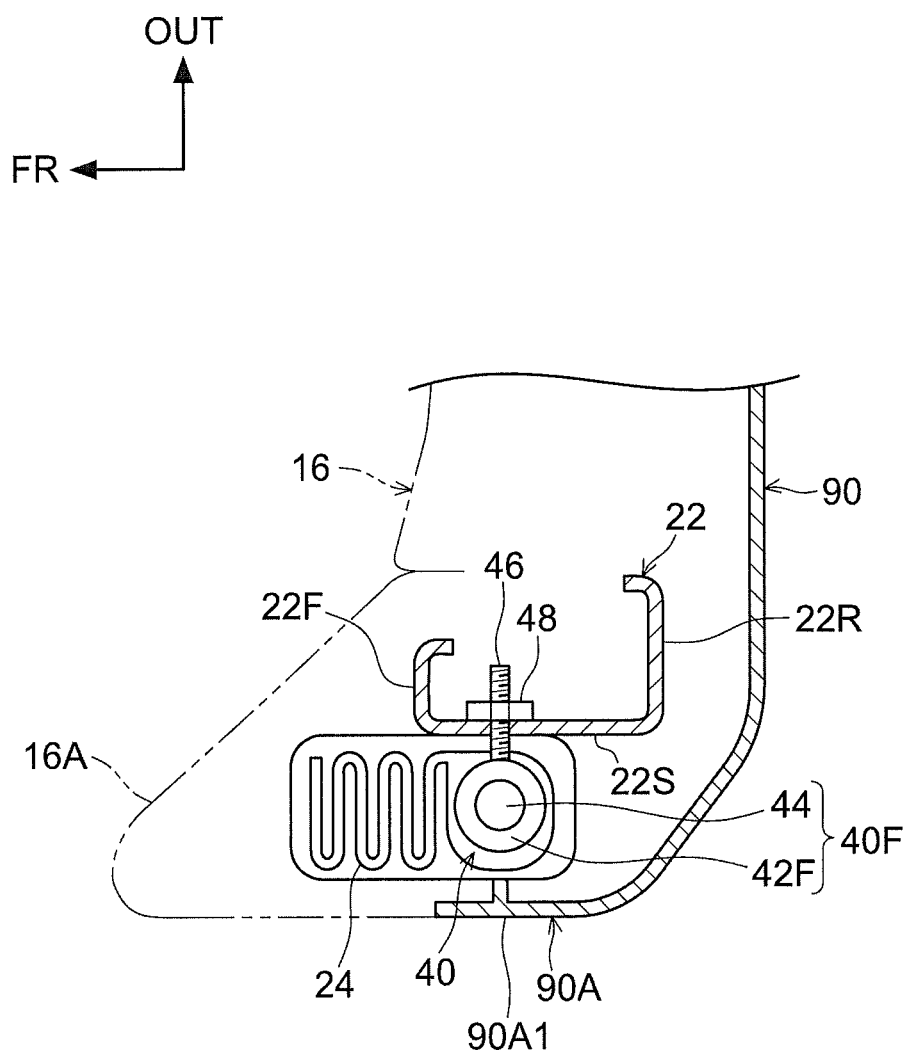
FIG. 11 is an enlarged sectional view corresponding to the cross-section cut along line F11-F11 of FIG. 10.

As shown in FIG. 11, a back board side portion 90A, that is at the vehicle transverse direction central side of the seat back board 90, circles-around toward the vehicle transverse direction central side of the inflator 40 from the back surface side of the seat back 16 along the outer peripheral surface of the central-side side portion 16A. This back board side portion 90A covers the inflator 40, that is accommodated in the central-side side portion 16A, from the vehicle transverse direction central side and over the entire axial direction (length direction) length of the inflator 40. Note that FIG. 11 illustrates the side airbag 24 that is in a state of being housed in a state of being folded-up in the central-side side portion 16A.

Further, the back board side portion 90A covers, from the vehicle transverse direction central side, the diffuser 26 and the side airbag 24 that are housed in states of being folded-up in the central-side side portion 16A. Damage to the side airbag 24 by the gas supplying end portion 40F is mitigated due to an outer surface 90A1 of this back board side portion 90A receiving the head portion H (see FIG. 4A) of the front passenger's seat vehicle occupant Q of the other seat that approaches the gas supplying end portion 40F of the inflator 40 from the vehicle transverse direction central side accompanying a vehicle collision.

Operation of the third embodiment is described next.

The seat back board 90 is disposed at the back surface side of the seat back 16. The back board side portion 90A, that is at the vehicle transverse direction central side of the seat back board 90, circles-around toward the vehicle transverse direction central side of the gas supplying end portion 40F of the inflator 40 from the back surface side of the seat back 16 along the outer surface of the central-side side portion 16A. Namely, the back board side portion 90A is disposed at the vehicle transverse direction central side of the gas supplying end portion 40F.

Interference of the side airbag 24 with respect to the gas supplying end portion 40F is suppressed due to the outer surface 90A1 of this back board side portion 90A receiving the head portion H (see FIG. 4A) of the front passenger's seat vehicle occupant Q of the other seat that approaches the gas supplying end portion 40F of the inflator 40 from the vehicle transverse direction central side accompanying a vehicle collision. Due thereto, damage to the side airbag 24 by the gas supplying end portion 40F is mitigated. Accordingly, a decrease in the restraining force of the side airbag 24 with respect to the driver's seat vehicle occupant P and the front passenger's seat vehicle occupant Q is suppressed.

Further, effects of the gas supplying end portion 40F on the vehicle occupant Q also are mitigated.

Further, an increase in the number of parts is suppressed due to the back board side portion 90A of the seat back board 90 being used as the protecting portion.

Note that, in the present embodiment, the back board side portion 90A covers the inflator 40 over the entire length in the axial direction of the inflator 40. However, the present embodiment is not limited to this. The back board side portion 90A can cover at least the gas supplying end portion 40F of the inflator 40 from the vehicle transverse direction central side.

Fourth Embodiment

A fourth embodiment is described next. Note that, in the following description, members and the like that are similar to those of the first embodiment are denoted by the same reference numerals, and description thereof is omitted.

Figure 12A:
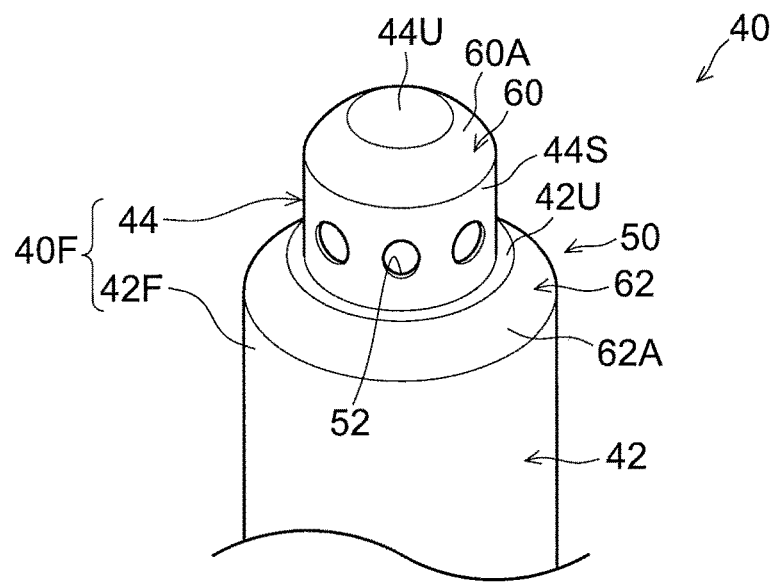
FIG. 12A is a perspective view showing a rounded portion that is formed at a gas supplying end portion of an inflator in a fourth embodiment.

As shown in FIG. 12A, in the fourth embodiment, rounded portions 60, 62 are formed at the upper edge portion of the jetting portion 44 and at the step portion 50 of the inflator 40. The rounded portion 60, that serves as an example of a protecting portion, is formed at the upper edge portion of the jetting portion 44 over the entire periphery of this upper edge portion. This rounded portion 60 is formed by the angled edge of the upper edge portion of the jetting portion 44 being chamfered into a curved surface (curvilinear surface) 60A.

Figure 12B:
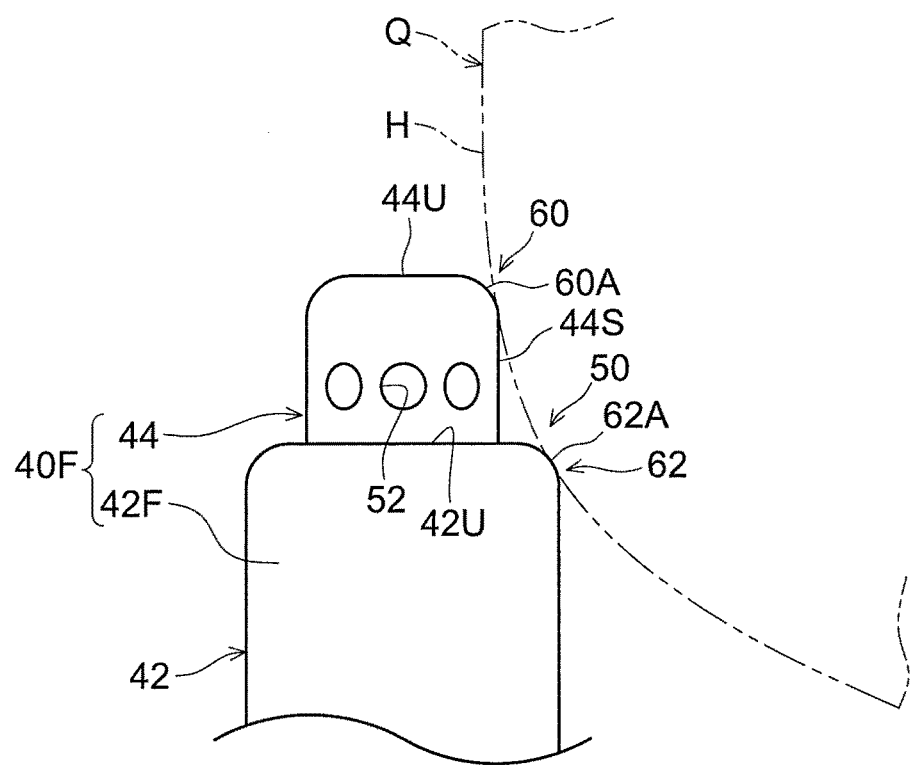
FIG. 12B is a side view of the gas supplying end portion, that shows the rounded portion shown in FIG. 12A.

As shown in FIG. 12B, as seen in a side view, the curved surface 60A of the rounded portion 60 is formed from the upper surface 44U of the jetting portion 44 over to the side peripheral surface 44S, and is curved so as to form a convex shape from the inflator 40 toward the outer side. Due thereto, damage to the side airbag 24, that accompanies interference between the jetting portion 44 and the side airbag 24, is mitigated.

Similarly, the rounded portion 62 is formed at the step portion 50, that is between the jetting portion 44 and the inflator main body portion 42, over the entire periphery of this step portion 50. The rounded portion 62, that serves as an example of the protecting portion, is formed by the angled edge of the step portion 50 being chamfered into a curved surface (curvilinear surface) 62A. Due thereto, damage to the side airbag 24, that accompanies interference between the step portion 50 and the side airbag 24, is mitigated.

Operation of the fourth embodiment is described next.

The rounded portions 60, 62 are respectively formed at the upper edge portion of the jetting portion 44 and at the step portion 50. The rounded portions 60, 62 are formed by the angled edges of the upper edge portion of the jetting portion 44 and the step portion 50 being respectively chamfered into the curved surfaces 60A, 62A. Due to the head portion H (see FIG. 4A) of the front passenger's seat vehicle occupant Q of the other seat that has been pushed-against the side airbag 24 being received by the curved surfaces 60A, 62A of these rounded portions 60, 62, damage to the side airbag 24 and the diffuser 26 by the gas supplying end portion 40F is mitigated as compared with a case in which there are angled edges at the gas supplying end portion 40F. Accordingly, a decrease in the restraining force of the side airbag 24 with respect to the driver's seat vehicle occupant P and the front passenger's seat vehicle occupant Q is suppressed. Moreover, effects of the gas supplying end portion 40F on the front passenger's seat vehicle occupant Q also are mitigated.

Further, by eliminating or reducing the angled edges of the gas supplying end portion 40F that are a cause of damage to the side airbag 24, damage to the side airbag 24 that accompanies interference between the gas supplying end portion 40F and the side airbag 24 is mitigated more reliably.

Modified examples of the first through fourth embodiments are described next. Note that, hereinafter, the various types of modified examples are described by using the first embodiment as an example, but these modified examples can be appropriately applied to the second through fourth embodiments as well.

In the above-described first embodiment, the FS airbag device 10 is installed in the driver's seat 12 that is at the right side of the vehicle, but the above-described first embodiment is not limited to this. The above-described first embodiment may be applied to, for example, a (separate-type) vehicle seat of a second row or a row therebehind in which left and right seats are disposed so as to be apart in the vehicle transverse direction.

Further, in the above-described first embodiment, the head portion H of the front passenger's seat vehicle occupant Q of the other seat interferes with the gas supplying end portion 40F of the inflator 40 via the side airbag 24. However, the above-described first embodiment is not limited to this structure. For example, damage to the side airbag 24 by the gas supplying end portion 40F is mitigated also in cases in which, for example, the shoulder or the arm of the front passenger's seat vehicle occupant Q interferes with the gas supplying end portion 40F of the inflator 40 via the side airbag 24.

Further, in the above-described first embodiment, the upper edge portion of the jetting portion 44 and the step portion 50 of the inflator 40 may be chamfered into a planar surface, or, in the same way as in the fourth embodiment, may be chamfered into a curved surface.

Although first through fourth embodiments of the present invention have been described above, the present invention is not limited to these embodiments, and the first through fourth embodiments and various types of modified examples may be used by being combined appropriately. Of course, the present invention can be implemented in various forms within a scope that does not depart from the gist thereof.

What is claimed is:

1. A far side airbag device for a vehicle, comprising:
an inflator that is provided at a vehicle transverse direction central-side side portion of a seat back along a height direction of the seat back, and that jets gas out from a jetting portion that is provided at a gas supplying end portion at an upper end side of the inflator;
a side airbag that is provided at the vehicle transverse direction central-side side portion, has an interior that houses the inflator, receives a supply of gas from the inflator and is thereby inflated and expanded, and covers, from a vehicle transverse direction central side, at least a region from a chest portion to a head portion of a vehicle occupant;
a diffuser that is housed at the interior of the side airbag, and that receives a supply of gas from the inflator and is thereby inflated and expanded in a shape of a tube that surrounds the inflator; and
a protecting portion that covers the gas supplying end portion in a state in which the side airbag and the diffuser are inflated and expanded,
wherein the protecting portion includes a protecting patch that is provided along the diffuser, is inflated and expanded together with the diffuser, and covers the gas supplying end portion.

2. The far side airbag device for a vehicle of claim 1, wherein the protecting patch is provided at an inner peripheral surface of the diffuser.

3. The far side airbag device for a vehicle of claim 1, wherein the protecting portion includes a protecting cap that is put on the gas supplying end portion and that has an opening through which gas passes.

4. The far side airbag device for a vehicle of claim 3, wherein the protecting cap is mounted to the gas supplying end portion in a state in which a gap is formed between the protecting cap and the gas supplying end portion.

5. The far side airbag device for a vehicle of claim 3, wherein the opening is formed in an upper surface of the protecting cap.

6. The far side airbag device for a vehicle of claim 3, wherein an upper edge portion of the protecting cap is chamfered into a curved surface.

7. A far side airbag device for a vehicle, comprising:
an inflator that is provided at a vehicle transverse direction central-side side portion of a seat back along a height direction of the seat back, and that jets gas out from a jetting portion that is provided at a gas supplying end portion at an upper end side of the inflator;
a side airbag that is provided at the vehicle transverse direction central-side side portion, has an interior that houses the inflator, receives a supply of gas from the inflator and is thereby inflated and expanded, and covers, from a vehicle transverse direction central side, at least a region from a chest portion to a head portion of a vehicle occupant;
a diffuser that is housed at the interior of the side airbag, and that receives a supply of gas from the inflator and is thereby inflated and expanded in a shape of a tube that surrounds the inflator; and
a protecting portion that covers the gas supplying end portion in a state in which the side airbag and the diffuser are inflated and expanded,
wherein the protecting portion includes a back board side portion of a seat back board that circles around from a back surface side of the seat back toward a vehicle transverse direction central side of the gas supplying end portion.

8. The far side airbag device for a vehicle of claim 7, wherein the back board side portion covers the inflator from a vehicle transverse direction central side and over an entire length of the inflator in a length direction of the inflator.

9. The far side airbag device for a vehicle of claim 1, wherein
the inflator has an inflator main body portion that extends along a height direction of the seat back,
the jetting portion has jetting holes that jet gas out, and the jetting portion projects out in a shape of a protrusion from an upper surface of the inflator main body portion, and forms a step portion between the jetting portion and the inflator main body portion, and
the gas supplying end portion includes the jetting portion and the step portion.

10. A far side airbag device for a vehicle, comprising:
an inflator that is provided at a vehicle transverse direction central-side side portion of a seat back along a height direction of the seat back, and that jets gas out from a jetting portion that is provided at a gas supplying end portion at an upper end side of the inflator;
a side airbag that is provided at the vehicle transverse direction central-side side portion, has an interior that houses the inflator, and receives a supply of gas from the inflator and is thereby inflated and expanded;

a diffuser that is housed at the interior of the side airbag, and that receives a supply of gas from the inflator and is thereby inflated and expanded in a shape of a tube that surrounds the inflator; and a protecting portion that is formed at the gas supplying end portion, and at which an angled edge of the gas supplying end portion is chamfered into a curved surface, wherein the protecting portion includes a protecting patch that is provided along the diffuser, is inflated and expanded together with the diffuser, and covers the gas supplying end portion.

11. The far side airbag device for a vehicle of claim 10, wherein the inflator has an inflator main body portion that extends along a height direction of the seat back, the jetting portion has jetting holes that jet gas out, and the jetting portion projects out in a shape of a protrusion from an upper surface of the inflator main body portion, and forms a step portion between the jetting portion the inflator main body portion, the gas supplying end portion includes the jetting portion and the step portion, and the protecting portion is formed respectively at an upper edge portion of the jetting portion and at the step portion.

* * * * *